350-171

CROSS REFERENCE SEARCH ROOM 250
220

X2545

March 31, 1964 W. W. KESTENBAUM 3,127,517

COLOR DISCRIMINATING APPARATUS

Filed April 27, 1956 3 Sheets-Sheet 1

INVENTOR
WILLIAM W. KESTENBAUM
BY
R. V. Craddock
ATTORNEY

March 31, 1964 W. W. KESTENBAUM 3,127,517

COLOR DISCRIMINATING APPARATUS

Filed April 27, 1956 3 Sheets-Sheet 2

INVENTOR
WILLIAM W. KESTENBAUM
BY
[signature]
ATTORNEY

March 31, 1964 W. W. KESTENBAUM 3,127,517

COLOR DISCRIMINATING APPARATUS

Filed April 27, 1956 3 Sheets-Sheet 3

INVENTOR
WILLIAM W. KESTENBAUM
BY [signature]
ATTORNEY

3,127,517
COLOR DISCRIMINATING APPARATUS

William W. Kestenbaum, Long Beach, N.Y., assignor to Sperry Rand Corporation, a corporation of Delaware Filed Apr. 27, 1956, Ser. No. 581,245
5 Claims. (Cl. 250—220)

This invention relates to photoelectric scanning apparatus and more particularly to apparatus for photoelectrically scanning a chart having lines of different colors superposed thereon and for producing a signal when and only when a line of one of said colors is being crossed.

In certain automatic plotting systems, for example, a system of the type described in U.S. patent application Serial No. 537,629, filed September 30, 1955, by Robert L. Frank, now Patent No. 2,916,629, a chart having printed thereon two sets of intersecting grid lines is recurrently scanned along a path transverse to the lines. Light reflected from the chart is directed by the scanner to a photosensitive detector which produces a pulse as each grid line is crossed. The time between pulses corresponds to the spacing along the path of scan of the grid lines. However, it is necessary in this system to produce a separate pulse train corresponding to each grid line set. In order to distinguish one line set from the other a different color is employed for each set. Previously, two color filters, each transmitting a preferred color corresponding to one line set color, were interposed on alternate scans between the scanner and the photosensitive detector. In this manner, with a particular filter interposed, strong light impulses were delivered to the photosensitive detector only when the lines of one set were being crossed. However, since these filters do not completely attenuate colors other than the preferred color, weaker light impulses were delivered when lines of the other set were being crossed. Consequently, the photosensitive detector produced strong desired pulses corresponding to the lines of one set and weaker undesired pulses corresponding to the lines of the other set.

It is the principal object of this invention to provide photoelectric scanning apparatus for scanning a chart having superposed thereon lines of different colors and for producing a signal when and only when a line of one color is being crossed.

It is a further object of this invention to provide photoelectric scanning apparatus for scanning a chart having superposed thereon lines of two different colors and for producing two corresponding pulse trains, the time between pulses of each train corresponding to the spacing along the path of scan of the lines of one color.

It is a further object of this invention to provide apparatus for removing undesired pulses from a pulse train containing a desired group of pulses and an undesired group of pulses.

According to the present invention light reflected from the chart is simultaneously directed by the scanner along first and second paths to respective first and second photosensitive detectors. Interposed in each path is a different color filter, each filter transmitting a preferred color corresponding to one line set color. The signal produced by each photosensitive detector is a composite pulse train comprising a group of desired strong pulses corresponding to one of the line sets and a group of undesired weaker pulses corresponding to the other of the line sets. A portion of the signal from the first photosensitive detector is passed through an attenuator wherein the magnitudes of the desired pulses are reduced to values equal to the magnitudes of the corresponding undesired pulses in the signal from the second photosensitive detector. The output signal from the attenuator and the signal from the second photosensitive detector are applied to a difference amplifier. The output signal of the difference amplifier contains only desired pulses of the second photosensitive detector signal. Similarly a signal containing only desired pulses of the first photosensitive detector signal may be obtained. In this manner there are generated two pulse trains, each train containing pulses corresponding to only one set of lines.

This invention will be described with reference to the accompanying drawings wherein.

Figure 1:
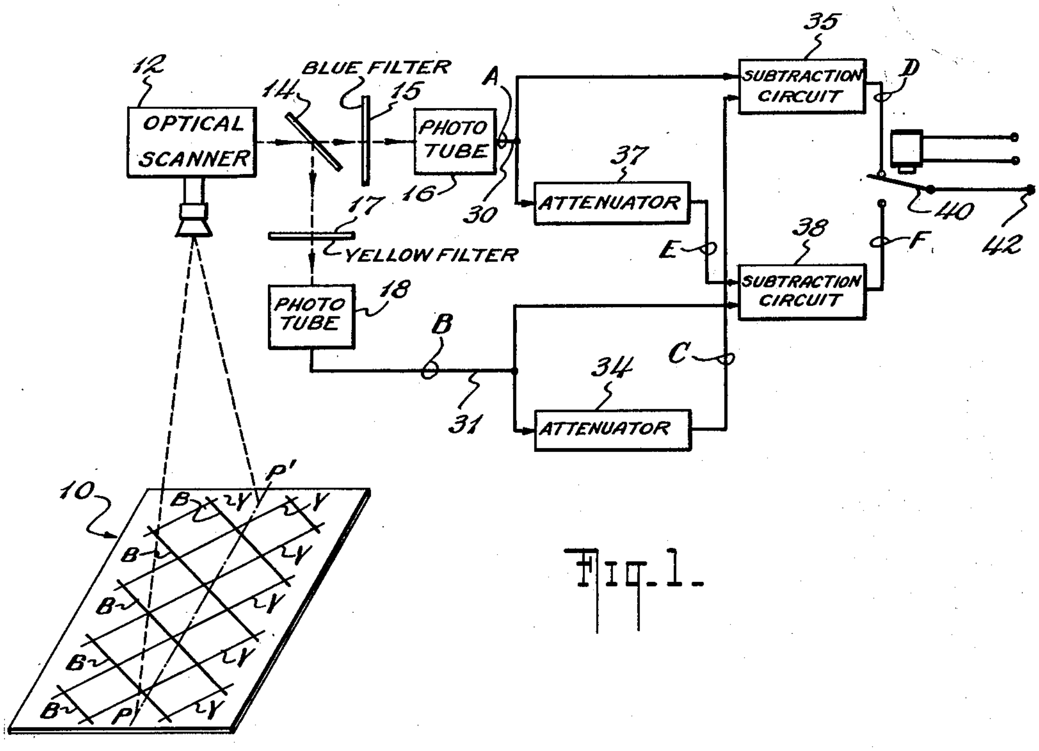
FIG. 1 is a diagram, partially in block form, illustrating the principle of operation of this invention.

In FIG. 1, on a chart 10 there are printed two sets of intersecting grid lines. Each grid line set is a different color; for example, one grid line set may be blue and the other set yellow. The lines of the blue line set are designated with the letter B and the lines of the yellow line set with the letter Y. Disposed above chart 10 is a scanning device, such as optical scanner 12. Scanner 12 is adapted to scan chart 10 along a path, such as path $p—p'$, transverse to both grid line sets. Scanner 12 receives light recurrently and successively from a series of contiguous elemental areas defining the path $p—p'$ along chart 10 and directs the light received to a half-silvered mirror 14. A portion of the light incident on mirror 14 passes through the mirror and through a blue color filter 15 to a photosensitive detector, such as phototube 16. Phototube 16 may be any device which produces a signal having an intensity corresponding to the amount of light received; such as, a photoconductive tube, a photovoltaic cell or a photoemissive tube. Another portion of the light incident on mirror 14 is reflected and passes through a yellow color filter 17 to a phototube 18, a device similar to phototube 16. Although a pair of filters 15 and 17 are shown for passing blue light from the light transmitted by mirror 14 and for passing yellow light from the light reflected by mirror 14, a single dichroic filter may be employed instead of the two filters and the half-silvered mirror. A dichroic filter is one which separates two color components from a ray of incident light and directs the components along separate paths.

Figure 2:
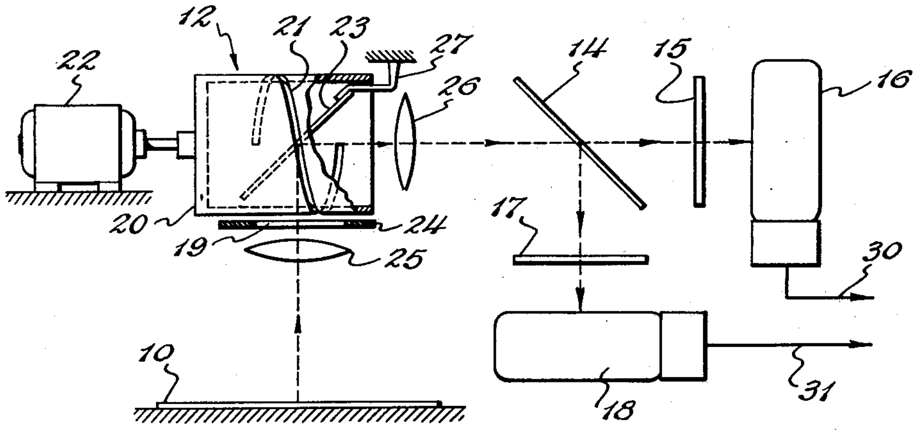
FIG. 2 is a drawing showing details of the optical scanner of FIG. 1.

As shown in FIG. 2, optical scanner 12 comprises a rotatable cylindrical drum 20 having a helical slit aperture 21 cut in a portion of its surface, a drive motor 22 and a mirror 23. A lens 25 is disposed to focus an image of the path $p—p'$ of chart 10 through an aperture slit 19 in a mask 24 onto the surface of drum 20. Drum 20 is rotated about its cylindrical axis by motor 22. As drum 20 rotates aperture 21 recurrently admits light from successive portions of the image formed at the surface of drum 20 by lens 25. Light admitted by aperture 21 is directed to mirror 23, where it is reflected and transmitted through a lens 26 to half-silvered mirror 14. Mirror 23 is fixedly supported within rotating drum 20 by a bracket member 27.

Figure 3:
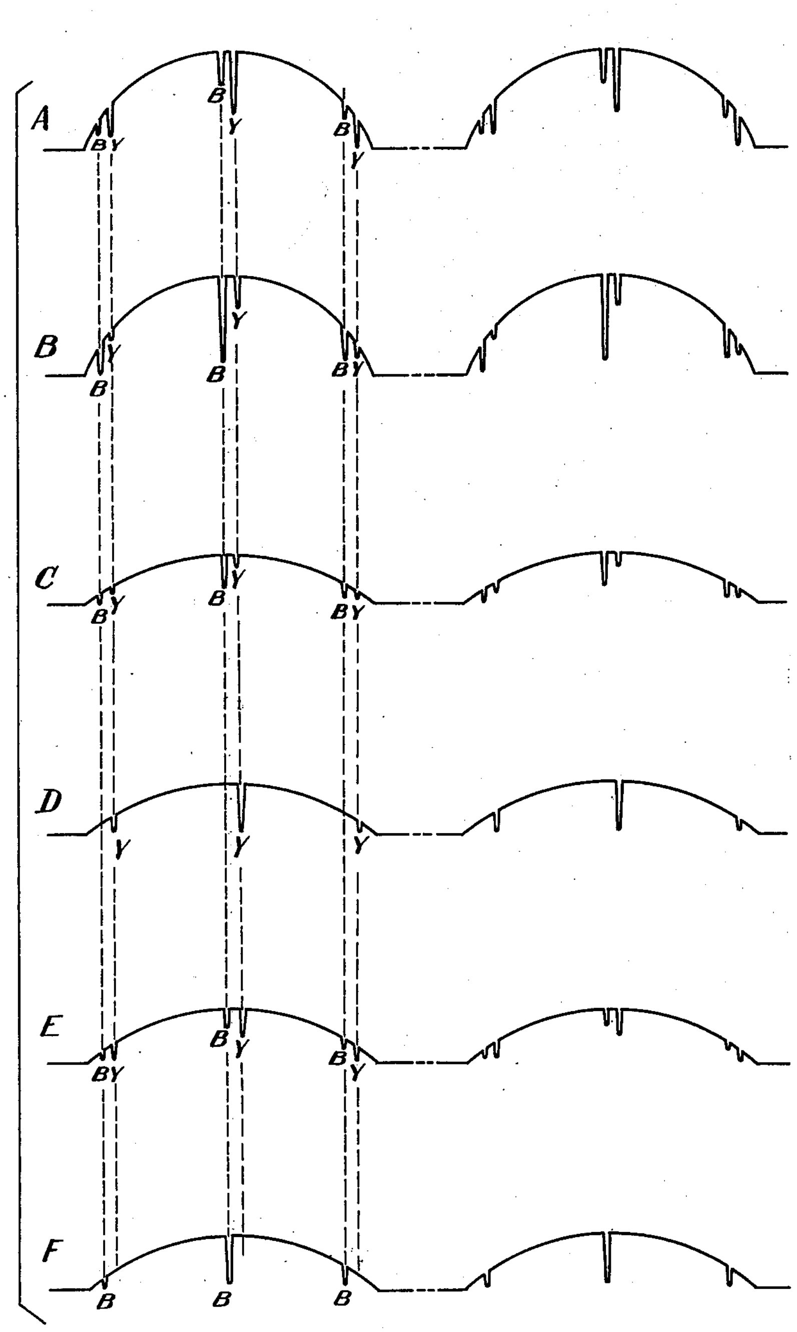
FIG. 3 is a drawing of waveforms of the circuit of FIG. 1.

The signals from phototubes 16 and 18 are delivered on respective leads 30 and 31. Two cycles of the recurrent signals from phototubes 16 and 18 are shown respectively in waveforms A and B of FIG. 3. Waveforms A and B result from the employment of a chart 10 having blue and yellow lines superposed on a light background, such as white. If chart 10 is illuminated by a substantially white light all colors of the spectrum are reflected from the light background, whereas only light deficient in red, which appears as blue to the eyes, will be reflected from the blue lines and only light deficient in blue, which appears as yellow to the eyes, will be reflected from the yellow lines. In reflected light directed by scanner 12 through mirror 14 to blue filter 15 any blue light is preferentially transmitted by the blue filter. Consequently, as chart 10 is scanned along path *p—p'*, phototube 16 will receive blue light except when the yellow lines are being crossed. From a cursory analysis of the system as so far presented it would appear that the signal from phototube 16 would be of constant magnitude so long as path *p—p'* is being scanned and blue light received by phototube 16, except for a sharp decrease in magnitude when the yellow lines are being crossed. However, such an ideal signal is distorted by various factors. Non-uniform illumination of chart 10, unequal scattering of light therefrom, non-uniform line width and coloring, and non-uniform transmission of light through the lenses employed are all factors which will cause an irregular amount of light to reach filter 15 from path *p—p'*, both from the packground area and the colored lines. The result is a non-uniform background signal, such as that represented by the bow-shaped curves of waveforms A and B.

Furthermore, although 15 preferentially transmits blue light it will also transmit, to a certain degree, light of other colors of the spectrum. Although the same amount of blue light may reach filter 15 when a blue line is being crossed as reaches it when the background area of chart 10 is being scanned, the total amount of light reaching the filter is considerably less. Additional complication is introduced by the fact that the lines may not be properly colored. Thus, the blue lines will not completely absorb the red colors of the spectrum, and will not perfectly reflect the blue colors. Hence, when the blue lines are being crossed a small decrease in the signal from phototube 16 will occur.

These decreases in signal from phototube 16 are indicated in waveform A as negative-going pulses from the background signal bow-shaped curve. Pulses occurring when yellow and blue lines are crossed are indicated by the respective letters Y and B. Pulses so designated will henceforth be referred to as Y-pulses and B-pulses.

In a manner similar to that described above, the signal from phototube 18 which receives light from path *p—p'* through yellow filter 17 comprises desired B-pulses and undesired Y-pulses.

If the signal of waveform B were to be passed through a high pass filter to eliminate the background signal components and leave only the pulse components a composite signal would remain, comprising the Y-pulse components and the B-pulse components. It would be necessary in order to obtain a desired signal containing only Y-pulses to eliminate the B-pulses. However, since the largest magnitude undesired B-pulses may be greater than the smallest magnitude Y-pulses it would be impossible to separate the two pulse components by any simple process such as clipping. The method by which this invention eliminates the undesired pulse components is described in the following paragraphs.

A portion of the signal from phototube 18, as represented by waveform B, is coupled to an attenuator 34. Sufficient attenuation is introduced to reduce the input signal so that the magnitudes of the desired B-pulses are equal to the magnitudes of the corresponding undesired B-pulses of waveform A. A subtraction circuit 35 is adapted to receive a pair of input signals and to produce an output signal proportional to the difference in magnitude between the pair of received signals. Subtraction circuit 35 may be, for example, a differential amplifier of the type described in vol. 21, page 42, Radiation Laboratory Series, by Greenwood et al. The output signal of phototube 16, as represented by waveform A, and the output signal of attenuator 34, as represented by waveform C, are applied as an input signal pair to subtraction circuit 35. The output signal of subtraction circuit 35 is shown in waveform D. In subtraction circuit 35 the corresponding B-pulses in each input signal were equal and consequently cancelled. The Y-pulses of waveform A were reduced slightly in magnitude due to the small corresponding Y-pulse components in waveform C. Output waveform D contains only Y-pulses and represents one of the desired signals.

In a manner similar to that described above a portion of the output signal of phototube 16 is coupled to an attenuator 37. Sufficient attenuation is introduced to reduce the input signal so that the magnitudes of the desired Y-pulses are equal to the magnitudes of the corresponding undesired Y-pulses in waveform B. The output signal of phototube 18, as represented by waveform B, and the output signal of attenuator 37, as represented by waveform E, are combined in a subtraction circuit 38 to produce a signal, as represented by waveform F, in which only B-pulses remain. Waveform F represents the other desired signal. Prior to the time that the apparatus of this invention is intended to be used the system should be tested by successively positioning scanner 12 over lines of both colors and adjusting the attenuators 34 and 37 to assure complete cancellation of the undesired signal components in the respective output signals.

The output signals of subtraction circuits 35 and 38 may be coupled to separate fixed contacts of a relay 40. Actuation of the movable relay contact to any one of the fixed contacts selects the desired signal, which is then delivered to output terminal 42. If desired the voltage applied to the winding of relay 40 may be synchronized with the scan recurrence rate so that on successive scans the movable contact of relay 40 alternates between the two fixed contacts.

Figure 4:
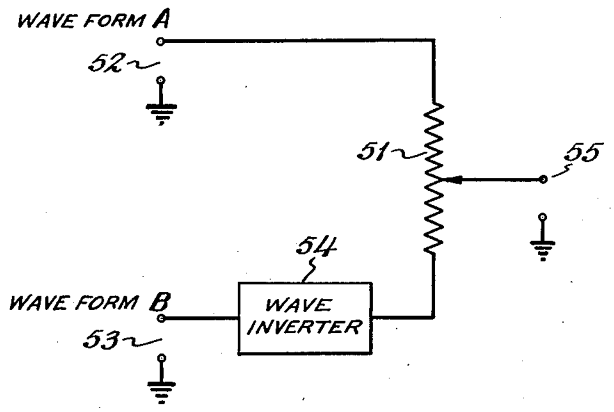
FIG. 4 is an exemplary attenuation and subtraction circuit.

A circuit which may be employed to perform the functions of an attenuator and a subtraction circuit in order to eliminate an undesired component in a composite signal is shown in FIG. 4. The circuit consists of a potentiometer 51 having a pair of signals applied at opposite ends thereof. For example, if it is desired to eliminate the undesired B-pulses of waveform A, the signal of waveform A must be applied to terminal 52 at one end of potentiometer 51. The signal of waveform B, which contains large B-pulses, but only small Y-pluses is applied to a second input terminal 53, which is coupled to a wave inverter 54. Wave inverter 54 may be, for example, an inverter amplifier. The output signal of wave inverter 54 is coupled to the other end of potentiometer 51. The movable arm of potentiometer 51 is adjusted so that the signal received at this movable arm has only the desired Y-pulses of waveform A and is devoid of the undesired B-pulses. The signal from the movable arm is available at an output terminal 55. If, in the circuit of FIG. 4, the signal containing the large magnitude desired pulse component and small magnitude undesired pulse component is the signal applied to terminal 52, the signal available at terminal 55 will have only the desired pulses. These desired pulses will have the same polarity as in the signal applied to terminal 52.

Although this invention has been described in relation to scanning a chart 10 having a light or white background it is within the scope of this invention to scan a chart having colored lines superposed on a dark background. In such instance there will be no significant background signal and the larger pulses produced by phototube 16, which receives light from chart 10 through a blue filter, will be pulses corresponding to the blue lines being scanned. Similarly, the larger pulses from phototube 18 will correspond to the yellow lines being scanned. The value of attenuator 37 must now be adjusted so that the magnitudes of the B-pulses are made equal to the magnitudes of the corresponding B-pulses in the output signal of phototube 18. As a consequence, the output of subtraction circuit 38 will be a signal having only Y-pulses. Similarly, the output signal of subtraction circuit 35 will contain only B-pulses.

Figure 5:
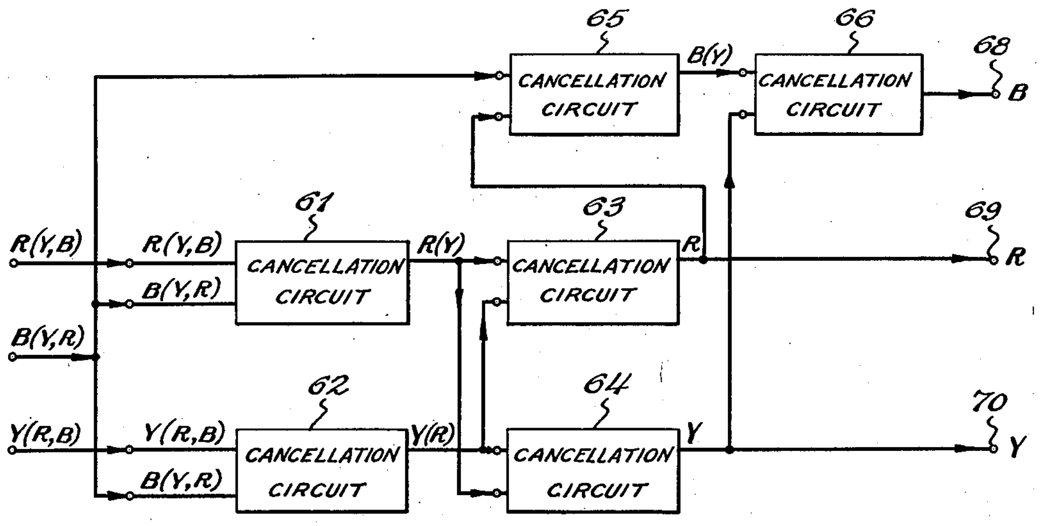
FIG. 5 is a block diagram illustrating a method for removing undesired pulse components in a three color system.

Although this invention has been described for eliminating an undesired group of pulses from a composite signal having large desired pulse components and a smaller undesired pulse group, it may be applied to systems wherein there is generated a composite signal having large desired pulse components and a plurality of smaller undesired pulse groups. Such a composite signal would be generated, for example, where lines of more than two different colors were scanned. As an example of the more general application of this invention, consider its application to the three colored system shown in FIG. 5. In this figure the basic circuit element employed is designated as a cancellation circuit, and may be the circuit of FIG. 4. Such a circuit is one that combines the functions of attenuating a first composite signal and subtracting the first composite signal from a second composite signal in order to eliminate one undesired signal component from the second composite signal. If the chart being scanned has red, yellow and blue lines, three composite input signals may be obtained, in a first signal the R-pulses being predominant, in a second signal the Y-pulses being predominant, and in a third signal the B-pulses being predominant. In each of these composite signals two undesired pulse components appear. In FIG. 5, the predominant pulse component in the signal at each point in the circuit is designated first, and the undesired pulse components are included within parentheses. The signal with predominant R-pulses is applied to the upper input terminal of a cancellation circuit 61. The signal with predominant Y-pulses is applied to the upper input terminal of a cancellation circuit 62. The signal with predominant B-pulses is applied to the lower input terminals of cancellation circuits 61 and 62. By proper adjustment of each of cancellation circuits 61 and 62 output signals are obtained from which the undesired B-pulses have been eliminated. The output signal of cancellation circuit 61 has predominant R-pulses and smaller undesired Y-pulses. The output signal of cancellation circuit 62 has predominant Y-pulses and smaller undesired R-pulses. The output signal of cancellation circuit 61 is applied to the upper input terminal of a cancellation circuit 63 and to the lower input terminal of a cancellation circuit 64. The output signal of cancellation circuit 62 is coupled to the lower input terminal of cancellation circuit 63 and the upper input terminal of cancellation circuit 64. By proper adjustment of each of cancellation circuits 63 and 64 respective output signals are obtained having only R-pulses and only Y-pulses. Cancellation circuits 65 and 66 are employed to develop a signal having only B-pulses. The input signal in which the B-pulses are predominant is applied to the upper input terminal of cancellation circuit 65. A portion of the output signal of cancellation circuit 63 is applied to the lower input terminal of cancellation circuit 65. By proper adjustment of cancellation circuit 65 an output signal is obtained from which the undesired R-pulses have been eliminated. This output signal is applied to the upper input terminal of cancellation circuit 66. A portion of the output signal of cancellation circuit 64 is applied to the lower input terminal of cancellation circuit 66. By proper adjustment of cancellation circuit 66 an output signal is obtained having only B-pulses.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for scanning an illuminated chart having superposed thereon a plurality of discrete regions, each region being characterized by one of first and second colors, and for producing a first output signal when and only when a region characterized by said first color is being crossed and a second output signal when and only when a region characterized by said second color is being crossed, comprising in combination, first and second photosensitive means for producing composite output signals in accordance with the amount of light received thereby, a scanning means for receiving light successively from a series of contiguous elemental areas of said chart and for directing a first portion of said received light along a first path to the first photosensitive means and a second portion of said received light along a second path to the second photosensitive means, a first filter interposed in the path of said first light portion for preferentially transmitting light of said first color, a second filter interposed in the path of said second light portion for preferentially transmitting light of said second color, whereby each of the composite output signals of the first and second photosensitive means includes a first signal component having a magnitude corresponding to the light received from said first colored regions and a second signal component having a magnitude corresponding to the light received from said second colored regions, a first signal magnitude controlling means coupled to the first photosensitive means for receiving a portion of the composite output signal thereof and for producing a corresponding composite output signal wherein the magnitude of the larger signal component is substantially equal to the magnitude of the smaller signal component of the second photosensitive means composite output signal, a second signal magnitude controlling means coupled to the second photosensitive means for receiving a portion of the composite output signal thereof and for producing a corresponding composite output signal wherein the magnitude of the larger signal component is substantially equal to the magnitude of the smaller signal component of the first photosensitive means composite output signal, and first and second difference signal generating means each adapted to produce a signal representing the difference in magnitude between a pair of received signals, said first difference signal generating means being coupled to receive the respective composite output signals of the second photosensitive means and the first signal magnitude controlling means, and said second difference signal generating means being coupled to receive the respective composite output signals of the first photosensitive means and the second signal magnitude controlling means.

2. Apparatus for scanning an illuminated chart having superposed thereon a plurality of discrete regions, each region being characterized by one of first and second different colors, and for producing a first output signal when and only when a region characterized by one of said colors is being crossed and a second output signal when and only when a region characterized by said second color is being crossed, comprising in combination, first and second photosensitive means for producing composite output signals in accordance with the amount of light received thereby, a scanning means for receiving light successively from a series of contiguous elemental areas of said chart and for directing a first portion of said received light along a first path to the first photosensitive means and a second portion of said received light along a second path to the second photosensitive means, a first filter interposed in the path of said first light portion for preferentially transmitting light of said first color, a second filter interposed in the path of said second light portion for preferentially transmitting light of said second color, whereby the composite output signal of the first photosensitive means includes a larger desired signal component corresponding to the light received from said second colored regions and a smaller undesired signal component corresponding to the light received from said first colored regions and the output of the second photosensitive means includes a larger desired signal component corresponding to the light received from said first colored regions and a smaller undesired signal component corresponding to the light received from said second colored regions, a first signal magnitude controlling means coupled to the first photosensitive means for receiving a portion of the composite output signal thereof and for producing a corresponding composite output signal wherein the magnitude of the desired signal component from said first photosensitive means is substantially equal to the magnitude of the undesired signal component from said second photosensitive means, a first difference signal generating means adapted to produce a signal representing the difference in magnitude between a pair of signals, said difference signal generating means being coupled to receive a portion of the composite output signal of the second photosensitive means and the output signal of said first signal magnitude controlling means, whereby the undesired signal component from said second photosensitive means is substantially cancelled therein, a second signal magnitude controlling means coupled to said second photosensitive means for receiving a portion of the composite output signal thereof and for producing a corresponding composite output signal wherein the magnitude of the desired signal component from said second photosensitive means is substantially equal to the magnitude of the undesired signal component from said first photosensitive means, a second difference signal generating means coupled to receive a portion of the composite output signal of the first photosensitive means and the output signal of said second signal magnitude controlling means, whereby the undesired signal component from said first photosensitive means is substantially cancelled therein.

3. Apparatus for scanning an illuminated chart having superposed thereon a plurality of discrete regions, each region being characterized by one of first and second colors, and for producing a first output signal when and only when a region characterized by said first color is being crossed and a second output signal when and only when a region characterized by said second color is being crossed, comprising in combination, first and second photosensitive means for producing composite output signals in accordance with the amount of light received thereby, color filter means for receiving light of said two colors and for preferentially directing light of said first color along a first path to said first photosensitive means and for preferentially directing light of said second color along a second path to said second photosensitive means, a scanning means for receiving light successively from a series of contiguous elemental areas of said chart and for directing said received light to said color filter means, whereby each of the composite output signals of said first and second photosensitive means includes first signal components having magnitudes corresponding to the light received from said first colored regions and second signal components having magnitudes corresponding to the light received from said second colored regions, a first signal magnitude controlling means coupled to the first photosensitive means for receiving a portion of the composite output signal thereof and for producing a corresponding composite output signal wherein the magnitudes of the signal components corresponding to the regions of the second color are substantially equal to the magnitudes of the signal components corresponding to the regions of the second color in the signal transmitted by said second photosensitive means, a second signal magnitude controlling means coupled to the second photosensitive means for receiving a portion of the composite output signal thereof and for producing a corresponding composite output signal wherein the magnitudes of the signal components corresponding to the regions of the first color are substantially equal to the magnitudes of the signal components corresponding to the regions of the first color in the signal transmitted by said first photosensitive means, a first difference signal generating means adapted to produce a signal representing the difference in magnitude between a pair of input signals, said first difference signal generating means being coupled to receive a portion of the output signal of said first photosensitive means and the output signal of said second signal magnitude controlling means, whereby the component signals corresponding to the regions of said first color are substantially cancelled and the component signals corresponding to said second colored regions are transmitted therethrough, and a second signal difference generating means coupled to receive a portion of the output signal of said second photosensitive means and the output signal of said first signal controlling means, whereby the component signals corresponding to said second colored regions are substantially cancelled and the component signals corresponding to said first colored regions are transmitted therethrough.

4. In an apparatus responsive to an input signal comprised of first and second component signals, means for separating said two component signals and making each available as a separate output signal, comprising in combination, signal discriminating means for receiving said input signal and providing first and second composite output signals wherein said first component signal is predominant in said first composite signal and said second component signal is predominant in said second composite signal, a first signal magnitude controlling means coupled to receive a portion of said first composite signal for producing a corresponding composite output signal wherein the magnitude of said first component signal is substantially equal to the magnitude of the first component signal of the second composite signal, a second signal magnitude controlling means coupled to receive a portion of said second composite output signal for producing a corresponding composite output signal wherein the magnitude of the second component signal is substantially equal to the magnitude of the second component signal of said first composite signal, a first signal difference generating means adapted to produce an output signal representing the difference in magnitude between two input signals, said signal difference generating means being coupled to receive a portion of the first composite output signal and the output signal of said second signal controlling means, and a second difference signal generating means coupled to receive a portion of said second composite signal and the output of said first signal controlling means.

5. In an apparatus responsive to an input signal comprised of first and second different information signals, means for separating said two information signals and making each available as a separate output signal, comprising in combination, information signal discriminating means for receiving said input signal and providing first and second composite output signals, the magnitude of said first information signal bearing a first ratio to the magnitude of said second information signal in said first composite signal and a second different ratio in said second composite signal, a first signal magnitude controlling means coupled to receive a portion of said first composite signal for providing a corresponding composite output signal wherein the magnitude of said first information signal is substantially equal to the magnitude of the first information signal of the second composite signal, a second signal magnitude controlling means coupled to receive a portion of said second composite output signal for producing a corresponding composite output signal wherein the magnitude of the second information signal is substantially equal to the magnitude of the second information signal of said first composite signal, a first difference signal generating means for producing an output signal which is a function of the difference in magnitudes between a pair of input signals, said difference signal generating means being coupled to receive a portion of the first composite output signal and the output signal of said second signal magnitude controlling means, and a second difference signal generating means coupled to receive a portion of said second composite signal and the output of said first signal magnitude controlling means.

References Cited in the file of this patent

UNITED STATES PATENTS

| | | |
|---|---|---|
| 2,335,180 | Goldsmith | Nov. 23, 1943 |
| 2,594,382 | Bedford | Apr. 29, 1952 |
| 2,672,786 | Capstaff | Mar. 23, 1954 |
| 2,697,742 | Evans | Dec. 21, 1954 |
| 2,724,737 | Hogan | Nov. 22, 1955 |
| 2,733,291 | Kell | Jan. 31, 1956 |
| 2,740,828 | Haynes | Apr. 3, 1956 |